Oct. 19, 1954  W. H. ARMISTEAD  2,691,855
HIGH-TEMPERATURE THERMOMETER TUBE AND GLASS THEREFOR
Filed June 12, 1952
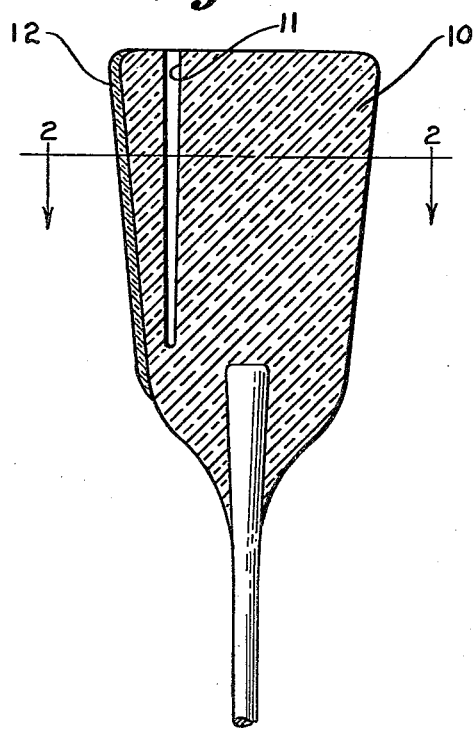
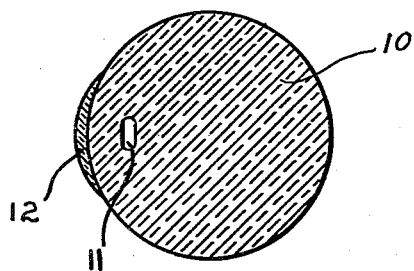
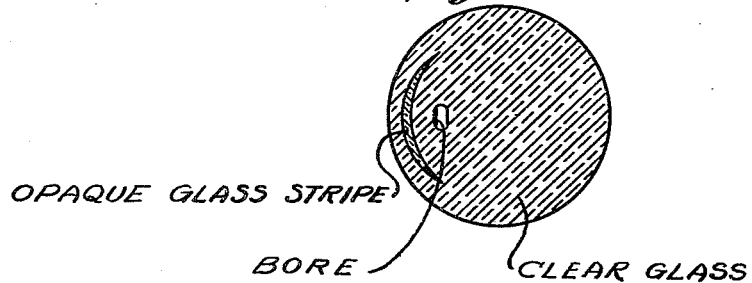
INVENTOR.
WILLIAM H. ARMISTEAD
BY Rolf E. Schneider
ATTORNEY.

Patented Oct. 19, 1954

2,691,855

UNITED STATES PATENT OFFICE 2,691,855

HIGH-TEMPERATURE THERMOMETER TUBE AND GLASS THEREFOR

William H. Armistead, Corning, N. Y., assignor to Corning Glass Works, Corning, N. Y., a corporation of New York Application June 12, 1952, Serial No. 293,076

10 Claims. (Cl. 49—92)

This invention relates to thermally opacifiable glasses. More particularly the invention pertains to high-temperature mercury thermometers and to glasses suitable for forming opacified backs within the glass tubes therefor. This application is a continuation in part of my pending application, Serial No. 175,290, filed July 21, 1950, since abandoned.

High-temperature mercury thermometers are intended for service at temperatures up to the order of 650° C. and must be made of glass which will not soften sufficiently at that temperature to permit any distortion of the tube. In other words the strain point of the glass or the highest temperature at which the glass is too viscous to flow must be substantially above the highest temperature at which the thermometer is to be used.

Clear glasses of this type are of course known. There has not been heretofore available, however, a thermally opacifiable glass which can be successfully incorporated within such a clear glass to form the customary opacified back for a thermometer tube. Attempts to use known thermally opacifiable glasses for such purpose result in the production of breaking stresses within the tube wall because such thermally opacifiable glasses have strain points too far below those of the clear glasses customarily utilized for this purpose.

In order to provide such a tube with an opacified back it has been necessary to apply a stripe of opaque enamel to the outside of the tube. Enamels suitable for this use, however, have disadvantages and are not entirely satisfactory: they are soft and scratch easily and they weather more readily than the tube itself. Moreover, the enamel coating is too far from the bore of the tube.

I have now discovered a composition for thermally opacifiable glass which is particularly adapted to be incorporated within the wall of such a high-temperature thermometer tube without causing breakage thereof and which has proved satisfactory in all respects.

The new composition comprises essentially 40% to 60% $SiO_2$, 10% to 25% $Al_2O_3$, at least one divalent metal oxide selected from the group consisting of MgO, CaO, ZnO, SrO, CdO, BaO and PbO, the selected divalent metal oxide including an oxide selected from the group consisting of MgO, CaO and a mixture of MgO and CaO, the maximum amount of such selected oxide not exceeding 20%, the total divalent metal oxide content being between 5% and 25%, and 8% to 25% $TiO_2$, the total percentage of such essential constituents being at least 80%. In order to provide additional fluxes for melting of the batch or to adjust the expansion coefficient of the glass, up to 5% of one or more of the alkali metal oxides $Li_2O$, $Na_2O$ and $K_2O$, or up to 20% $B_2O_3$, or both alkali metal oxide and $B_2O_3$ in the named proportions may, if desired, be added to the composition.

The following compositions (exclusive of any fining agent such as arsenic oxide) given in percent by weight as calculated from their batches on the oxide basis are glasses which are thermally opacifiable in accordance with the invention:

|  | 1 | 2 | 3 | 4 | 5 | 6 | 7 | 8 | 9 | 10 | 11 | 12 | 13 |
|---|---|---|---|---|---|---|---|---|---|---|---|---|---|
| $SiO_2$ | 50.0 | 52.7 | 52 | 52 | 48 | 55 | 57 | 48 | 49 | 54 | 51 | 57 | 60 |
| $Al_2O_3$ | 18.8 | 19.8 | 17 | 14 | 17 | 14 | 20 | 17 | 14 | 18 | 18 | 18 | 18 |
| MgO | 10.3 | 11.0 |  |  |  |  |  |  |  | 17 | 20 | 14 | 11 |
| CaO | 4.1 | 4.4 | 12 | 17 | 8 | 14 | 10 | 8 | 20 |  |  |  |  |
| BaO |  |  |  |  |  |  |  | 6 |  |  |  |  |  |
| $TiO_2$ | 15.8 | 11.1 | 8 | 17 | 12 | 17 | 10 | 13 | 17 | 11 | 11 | 11 | 11 |
| $Li_2O$ | 0.9 |  |  |  |  |  | 3 |  |  |  |  |  |  |
| $Na_2O$ | 0.1 | 1.0 |  |  |  |  |  |  |  |  |  |  |  |
| $B_2O_3$ |  |  | 11 |  | 15 |  |  | 8 |  |  |  |  |  |

Variations in the proportions of the essential constituents of the present glasses, namely $SiO_2$, $Al_2O_3$, divalent metal oxides and $TiO_2$, should be confined within the limits set forth above for the following reasons:

The glass becomes increasingly difficult to melt and tends to devitrify during working if the content of either $SiO_2$ or $Al_2O_3$ is too high or the content of divalent metal oxide is too low. On the other hand, the glass will be too soft if the content of divalent metal oxide is too high.

A deficiency of $Al_2O_3$ lowers the strain point of the glass sufficiently to cause breakage on cooling of a tube within the wall of which the glass is incorporated.

A deficiency of $SiO_2$ or $TiO_2$ results in a clear glass which will not opacify. An excess of $TiO_2$, on the other hand, will not dissolve in the molten glass and forms stones therein.

For satisfactory opacification of the present glasses, the $TiO_2$ must be completely dissolved during melting and reprecipitated as a uniformly finely divided precipitate by subsequent heat treatment. The liquidus of these glasses ranges between about 1100° and 1400° C. and in general increases with the $TiO_2$ content. The nucleation temperature, that is, the temperature at which invisible nuclei of $TiO_2$ begin to form is lower than the liquidus. Consequently, opacification is brought about by cooling the glass substantially below its nucleation temperature, generally below 1000°–1200° C., to form such invisible nuclei and thereafter reheating the glass substantially above the nucleation temperature but below the liquidus to cause the nuclei to grow by recrystallization.

For better understanding of the invention, reference is had to the accompanying drawing in which:

Fig. 1 is a sectional elevation of a partly completed tube blank for making a thermometer tube in accordance with the invention;

Fig. 2 is a cross-section on the line 2—2 of Fig. 1;

Fig. 3 is a cross-section of a completed tube blank ready to be drawn.

In carrying the invention into practice, an opaque-backed glass tube for a high-temperature thermometer for use at temperatures up to but not exceeding 650° C. is made as follows:

A tube blank 10 having a bore 11 (Figs. 1 and 2) is prepared in known manner, e. g., in accordance with the description in Boals 1,749,016, from a molten transparent tube glass having a strain point above 650° C. and is cooled to a temperature of 1000°–1200° C. A quantity of molten glass having a composition within the range set forth above and a strain point approximating that of the clear glass is applied to the tube blank to form a stripe 12 parallel to the bore 11 thereof. Such stripe is quickly spread as thin as possible while soft so that it forms a layer extending around the periphery of the tube blank for approximately about one sixth of its circumference. Such manipulation will normally cool the stripe of glass to below the nucleation temperature thereof, but further cooling may be resorted to if necessary. The tube blank is thereupon covered with another layer of the molten transparent tube glass, thus causing the stripe to become reheated and thereby opacified, as shown in Fig. 3. After being marvered to final shape and reheated, the finished tube blank is drawn into tubing in the usual manner.

I claim:

1. A thermally opacifiable glass which comprises essentially 40% to 60% $SiO_2$, 10% to 25% $Al_2O_3$, at least one divalent metal oxide selected from the group consisting of MgO, CaO, ZnO, SrO, CdO, BaO, and PbO, the selection including a member of the group consisting of MgO, CaO and a mixture of MgO and CaO, the maximum amount of such member not exceeding 20%, the total divalent metal oxide content being between 5% and 25%, and 8% to 25% $TiO_2$, the total percentage of such essential constituents being at least 80%.

2. A thermally opacifiable glass which comprises essentially 40% to 60% $SiO_2$, 10% to 25% $Al_2O_3$, 5% to 20% of a member selected from the group consisting of MgO, CaO and a mixture of MgO and CaO, and 8% to 25% $TiO_2$, the total percentage of such essential constituents being at least 80%.

3. A thermally opacifiable glass which comprises essentially 40% to 60% $SiO_2$, 10% to 25% $Al_2O_3$, at least one divalent metal oxide selected from the group consisting of MgO, CaO, ZnO, SrO, CdO, BaO, and PbO, the selection including a member of the group consisting of MgO, CaO and a mixture of MgO and CaO, the maximum amount of such member not exceeding 20%, the total divalent metal oxide content being between 5% and 25%, and 8% to 25% $TiO_2$, the total percentage of such essential constituents being at least 80%, and at least one alkali metal oxide in an amount up to 5% selected from the group consisting of $Li_2O$, $Na_2O$ and $K_2O$.

4. A thermally opacifiable glass which comprises essentially 40% to 60% $SiO_2$, 10% to 25% $Al_2O_3$, at least one divalent metal oxide selected from the group consisting of MgO, CaO, ZnO, SrO, CdO, BaO, and PbO, the selection including a member of the group consisting of MgO, CaO and a mixture of MgO and CaO, the maximum amount of such member not exceeding 20%, the total divalent metal oxide content being between 5% and 25%, and 8% to 25% $TiO_2$, the total percentage of such essential constituents being at least 80%, and $B_2O_3$ in an amount up to 20%.

5. A thermally opacifiable glass which comprises essentially 40% to 60% $SiO_2$, 10% to 25% $Al_2O_3$, at least one divalent metal oxide selected from the group consisting of MgO, CaO, ZnO, SrO, CdO, BaO, and PbO, the selection including a member of the group consisting of MgO, CaO and a mixture of MgO and CaO, the maximum amount of such member not exceeding 20%, the total divalent metal oxide content being between 5% and 25%, and 8% to 25% $TiO_2$, the total percenage of such essential constituents being at least 80%, at least one alkali metal oxide in an amount up to 5% selected from the group consisting of $Li_2O$, $Na_2O$ and $K_2O$, and $B_2O_3$ in an amount up to 20%.

6. A thermally opacifiable glass which consists approximately of 50.0% $SiO_2$, 18.8% $Al_2O_3$, 10.3% MgO, 4.1% CaO, 15.8% $TiO_2$, 0.9% $Li_2O$ and 0.1% $Na_2O$.

7. An article including a portion of thermally opacified glass comprising essentially 40% to 60% $SiO_2$, 10% to 25% $Al_2O_3$, at least one divalent metal oxide selected from the group consisting of MgO, CaO, ZnO, SrO, CdO, BaO, and PbO, the selection including a member of the group consisting of MgO, CaO and a mixture of MgO and CaO, the maximum amount of such member not exceeding 20%, the total divalent metal oxide content being between 5% and 25%, and 8% to 25% $TiO_2$, the total percentage of such essential constituents being at least 80%, at least a portion of the $TiO_2$ being dispersed throughout the thermally opacified glass as finely divided precipitate.

8. A glass tube having a wall composed of clear glass having a strain point above 650 °C. and containing within such wall a layer of light-reflecting thermally opacified glass substantially parallel to its bore, said thermally opacified glass comprising essentially 40% to 60% $SiO_2$, 10% to 25% $Al_2O_3$, at least one divalent metal oxide selected from the group consisting of MgO, CaO, ZnO, SrO, CdO, BaO and PbO, the selection including a member of the group consisting of MgO, CaO and a mixture of MgO and CaO, the maximum amount of such member not exceeding 20%, the total divalent metal oxide content being between 5% and 25%, and 8% to 25% $TiO_2$, the total percentage of such essential constituents being at least 80%, at least a portion of the $TiO_2$ being dispersed throughout the thermally opacified glass as finely divided precipitate.

9. A glass tube having a wall composed of clear glass having a strain point above 650° C. and containing within such wall a layer of light-reflecting thermally opacified glass substantially parallel to its bore, said thermally opacified glass comprising essentially 40% to 60% $SiO_2$, 10% to 25% $Al_2O_3$, at least one divalent metal oxide selected from the group consisting of MgO, CaO, ZnO, SrO, CdO, BaO and PbO, the selection including a member of the group consisting of MgO, CaO and a mixture of MgO and CaO, the maximum amount of such member not exceeding 20%, the total divalent metal oxide content being between 5% and 25%, and 8% to 25% $TiO_2$, the total percentage of such essential constituents being at least 80%, and at least one alkali metal oxide in an amount up to 5% selected from the group consisting of $Li_2O$, $Na_2O$ and $K_2O$, at least a portion of the $TiO_2$ being dispersed throughout the thermally opacified glass as a finely divided precipitate.

10. A glass tube having a wall composed of clear glass having a strain point above 650° C. and containing within such wall a layer of light-reflecting thermally opacified glass substantially parallel to its bore, said thermally opacifiable glass comprising essentially 40% to 60% $SiO_2$, 10% to 25% $Al_2O_3$, at least one divalent metal oxide selected from the group consisting of MgO, CaO, ZnO, SrO, CdO, BaO and PbO, the selection including a member of the group consisting of MgO, CaO and a mixture of MgO and CaO, the maximum amount of such member not exceeding 20%, the total divalent metal oxide content being between 5% and 25%, and 8% to 25% $TiO_2$, the total percentage of such essential constituents being at least 80%, and $B_2O_3$ in an amount up to 20%, at least a portion of the $TiO_2$ being dispersed throughout the thermally opacified glass as a finely divided precipitate.

References Cited in the file of this patent

UNITED STATES PATENTS

| Number | Name | Date |
|---|---|---|
| 2,220,775 | Navias | Nov. 5, 1940 |
| 2,503,140 | Stookey | Apr. 4, 1950 |

FOREIGN PATENTS

| Number | Country | Date |
|---|---|---|
| 446,970 | Great Britain | May 6, 1936 |